United States Patent [19]
Taha

[11] Patent Number: 4,823,615
[45] Date of Patent: Apr. 25, 1989

[54] SELF-AVERAGING PITOT TUBE PROBE AND METHOD FOR MEASURING FLUID FLOW

[75] Inventor: Sami H. Taha, St. Laurent, Canada

[73] Assignee: Preso Industries, Plattsburgh, N.Y.

[21] Appl. No.: 116,590

[22] Filed: Nov. 4, 1987

[51] Int. Cl.⁴ .............................................. G01F 1/34
[52] U.S. Cl. ................................................. 73/861.66
[58] Field of Search ........................... 73/861.65, 861.66

[56] References Cited

U.S. PATENT DOCUMENTS

| | | | |
|---|---|---|---|
| 3,751,982 | 8/1973 | Lambert | 73/861.66 |
| 4,344,330 | 8/1982 | Renken et al. | 73/861.66 |
| 4,444,060 | 4/1984 | Yamamoto et al. | 73/861.66 |

FOREIGN PATENT DOCUMENTS

| | | | |
|---|---|---|---|
| 938081 | 9/1963 | United Kingdom | 73/861.65 |
| 2032118 | 4/1980 | United Kingdom | 73/861.66 |

*Primary Examiner*—Herbert Goldstein
*Attorney, Agent, or Firm*—Fleit, Jacobson, Cohn & Price

[57] ABSTRACT

A self-averaging pitot tube probe has an elongated elliptically-shaped body which produces laminar flow of fluid sub-boundary layers around the body. The body includes upstream high pressure sensing ports and a high pressure sensing passageway, and downstream low pressure sensing ports and a low pressure sensing passageway. The low pressure sensing ports open through respective opposite sides of the body upstream from separation points at which the laminar fluid flow sub-boundary layers separate from the body.

11 Claims, 2 Drawing Sheets

SELF-AVERAGING PITOT TUBE PROBE AND METHOD FOR MEASURING FLUID FLOW

BACKGROUND OF THE INVENTION

1. Field of the Invention

This invention relates to a self-averaging pitot tube probe and method for measuring fluid flow, and more particularly to a self-averaging pitot tube probe and method for use with a measuring device for measuring a pressure differential to determine fluid flow rate in a conduit, wherein the probe and method provide a stable and more accurate sensing of the low pressure component of the pressure differential and, thus, a higher degree of accuracy in the measurement of the fluid flow rate.

2. Description of the Related Art

U.S. Pat. No. 3,581,565 to P. D. Dieterich discloses a pitot tube flow measuring device comprising an upstream probe including an elongated hollow cylindrical body of circular cross section, which extends diametrically across a pipe or conduit during a flow measuring operation. The hollow cylindrical body has a plurality of longitudinally arranged high (dynamic) pressure sensing ports at an upstream side of the body. An interpolating or averaging tube is located within the hollow cylindrical body and has, at one end, an open port located centrally of the body for determining an average of the fluid flow into the body through the upstream sensing ports. The flow measuring device further includes a downstream probe of circular cross section and cylindrical construction, with a downstream facing port located centrally of the conduit in a low (static) pressure area. Both of the upstream and downstream probes are connected to a pressure differential measuring mechanism mounted externally of the conduit.

Another pitot tube flow measuring device, which is intended to be an improvement over the flow measuring device disclosed in the above-mentioned Dieterich patent, is disclosed in U.S. Pat. No. 4,154,100 to J. B. Harbaugh et al. This flow measuring device comprises a probe including an elongated hollow body having a portion of its length of triangular or diamond-shaped cross section, rather than circular. A key feature of the probe is the provision of sharply contoured edges located in transversely-spaced relationship on opposite sides of the hollow body, intermediate upstream and downstream facing surfaces.

More specifically, the upstream-facing surface is contoured to divide the fluid flow and direct essentially equal parts thereof across the sharply contoured opposite side edges, which function to fix the locations at which fluid flow boundary layer separation from the body occurs over a broad range of laminar and turbulent flow conditions. The downstream-facing surface is shaped so that reattachment of the fluid to the body then is precluded and so that a low (static) pressure sensing port in the downstream-facing surface lies within the wake of the fluid flowing past the sharply contoured edges, in a low (static) pressure area. The probe also includes upstream high pressure sensing ports and an internal interpolating or averaging tube, as in the flow measuring device of the above-mentioned Dieterich patent, and further includes an internal low pressure sensing tube, one end of which defines the above-mentioned low pressure sensing port in the downstream-facing surface of the probe body.

The primary purpose of this invention is to provide a new and improved self-averaging pitot tube probe and method for use in a measuring device for measuring a pressure differential to determine a fluid flow rate in a conduit, such as disclosed in the Dieterich and Harbaugh et al patents, wherein the probe provides a stable and more accurate sensing of the low pressure component of the pressure differential, and thus provides a higher degree of accuracy in measuring the fluid flow rate.

SUMMARY OF THE INVENTION

In general, this invention relates to a self-averaging pitot tube probe (and method) for use in a flow measuring device for measuring a pressure differential to determine fluid flow rate in a conduit, which comprises an elongated, elliptically-shaped body insertable transversely with respect to a stream of fluid flowing within the conduit. The elliptically-shaped body has a configuration which produces laminar flow of fluid sub-boundary layers around the body so that the sub-boundary layers remain attached to the body at least until the sub-boundary layers reach a downstream body portion. An upstream portion of the body includes sensing ports and an elongated passageway for sensing a high fluid pressure component of the measured pressure differential. An elongated low pressure sensing passageway is located in the body adjacent a transition from an intermediate body portion to the downstream body portion, and downstream ports open from the low pressure sensing passageway through the body for sensing a low pressure component of the measured pressure differential.

More specifically, the downstream low pressure sensing ports open through each of respective opposite sides of the elliptically-shaped body along its length, and are located upstream from (ahead of) separation points at which the laminar fluid flow sub-boundary layers separate from the body. The upstream high pressure sensing ports face upstream and are arranged along an upstream longitudinal edge of the body. Further, a transverse cross section of the elliptically-shaped body has a major axis length -to- minor axis width ratio in a range on the order of 1.70 to 5.65, with a chord of each quadrant of the body cross section intersecting the cross section major axis in a range on the order of 10° to 30°. The elliptically-shaped body may be of hollow or essentially solid construction.

DETAILED DESCRIPTION

Figure 1:
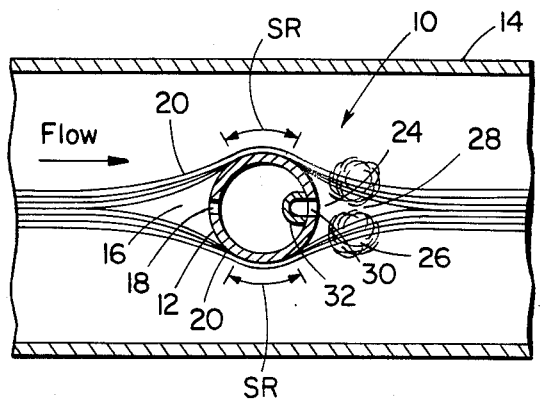
FIG. 1 is a schematic cross-sectional view illustrating the operation of a prior art probe of circular cross-sections.

Referring to FIG. 1, the normal manner of operation of a prior known-type self-averaging pitot tube probe 10 of circular cross-section, is schematically illustrated. The probe 10 includes an elongated cylindrical hollow body 12 which is insertable into a stream of fluid flowing within a pipe or conduit 14, diametrically across the pipe or conduit, and thus transversely to the direction of fluid flow. The flowing fluid creates an impact or high (dynamic) pressure zone 16 at an upstream side of the probe 10, and a series of upstream high pressure sensing ports 18 (only one shown) are provided along an upstream-facing surface of the probe.

In operation, as the fluid flows around an exterior surface of the probe body 12, fluid flow sub-boundary layers 20 separate from the body 12 at variable points on opposite sides of the body within arcuate separation regions, designated SR in FIG. 1, depending upon flow conditions. This creates a low pressure (static) zone 24 on a downstream side of the probe 10, including variable intensity vortices 26 and an essential vacuum in an area 28 downstream from the probe. The low pressure is sensed by a downstream port 30 located, for example, in one end of a low pressure sensing tube 32 disposed within the cylindrical body 12 or externally thereof, with the interior of the body and the low pressure sensing tube being suitably connected to respective portions of a pressure differential measuring mechanism (not shown).

The probe 10 of circular cross section as shown in FIG. 1 has a number of disadvantages. For example, the separation of the fluid flow sub-boundary layers 20 from the probe 10 at the variable points in the separation regions SR upstream from the low pressure zone 24 produces undesirable variations in the low pressure signal sensed by the low pressure sensing port 30. The probe 10 also has a turn down ratio (T.D.R.) on the order of only 4 to 1, creating variations in the above-mentioned vacuum in the downstream area 28, which has an adverse effect upon the measured low pressure signal. (Turn down ratio is defined as the ratio of maximum flow rate to minimum flow rate maintaining the same accuracy range, i.e., a variation in accuracy of ±1% from 500 GPM up to 2,000 GPM equals a T.D.R. of 4 to 1, and the same variation in accuracy of ±1% from 500 GPM up to 5,000 GPM equals a T.D.R. of 10 to 1) The variable intensity vortices 26 also create extraneous low pressure signal amplifications by causing vibration of the probe 10 and noise or acoustic effects in the sensed signal, so that reliable repeatability of performance of the probe cannot be obtained.

Figure 2:
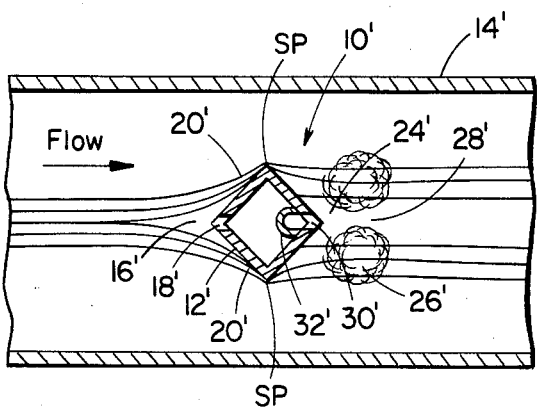
FIG. 2 is a schematic cross-sectional view illustrating the operation of a prior art probe of diamond-shaped cross-section.

FIG. 2 illustrates schematically another prior known-type probe 10' similar to the probe 10 shown in FIG. 1, except that the probe 10' is of diamond-shaped cross-section, rather than circular cross-section. As in the case of the probe 10 shown in FIG. 1, in operation, fluid flowing in a pipe or conduit 14' creates an impact or high (dynamic) pressure zone 16' at an upstream side of the probe 10', and the upstream side of a probe body 12' includes a plurality of upstream high pressure sensing ports 18' (only one shown) in an upstream leading edge of the body. The diamond-shaped probe body 12' of FIG. 2 differs from the circular-shaped probe body 12 of FIG. 1 in having a pair of opposite sharply contoured edges which define fluid flow separation points, designated SP, at which sub-boundary layers 20' of the flowing fluid are separated abruptly from opposite sides of the body. This creates a low (static) pressure zone 24' on a downstream side of the probe 10' and, as a result of the large "bluff" probe body 12' obstructing the flow stream, produces high intensity vortices 26' and a vacuum in a downstream area 28'. As in the probe 10 shown in FIG. 1, the low pressure in the low pressure zone 24' is sensed by a downstream port 30' located in one end of an elongated low pressure sensing tube 32', with the interior of the probe body 12' and the low pressure sensing tube 32' being suitably connected to respective portions of a pressure differential measuring mechanism (not shown).

As in the case of the probe 10 of FIG. 1, since in the probe 10' of FIG. 2 the separation of the fluid flow sub-boundary layers 20' occurs upstream of the low pressure sensing port 30', the probe 10' of FIG. 2 has the same disadvantages as the probe 10 of FIG. 1. Actually, since the large "bluff" body 12' of the probe 10' produces the high intensity downstream vortices 26', and the diamond-shaped cross section of the probe body 12' produces a relatively high drag coefficient (hence the high intensity downstream vortices 26') and a high pressure loss differential, errors in the measured pressure differential can be even more pronounced.

Figure 3:
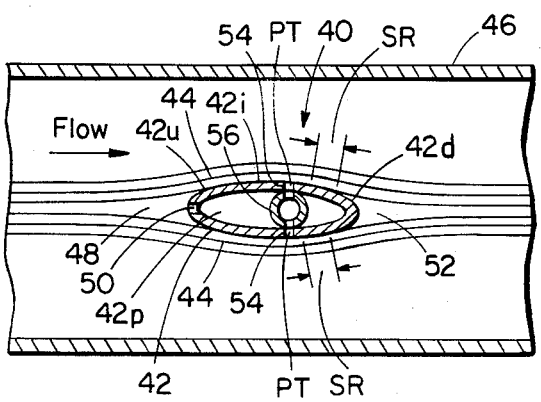
FIG. 3 is a schematic cross-sectional view illustrating the operation of a probe in accordance with the invention, having an elliptically-shaped cross-section.

Referring to FIG. 3, which illustrates the manner of operation of a probe 40 in accordance with the subject invention, it is seen that a primary feature of the invention is that the probe has a body 42 of an elliptically-shaped cross section, with a major axis aligned with the fluid flow, which produces a laminar flow of fluid sub-boundary layers 44 around the body so that the sub-boundary layers remain attached to an outer surface of the body throughout a major portion of the fluid's travel around the probe. Further, a low (static) pressure component of the pressure differential being measured is sensed upstream from the separation of the fluid flow sub-boundary layers 44 from the probe body 42 where the pressure is uniform and more consistent as compared to downstream. As a result, a stable and more accurate sensing of the low (static) pressure is obtained, thus producing a higher accuracy in the measurement of the fluid flow rate as compared to the probe designs shown in FIGS. 1 and 2.

Figure 4:
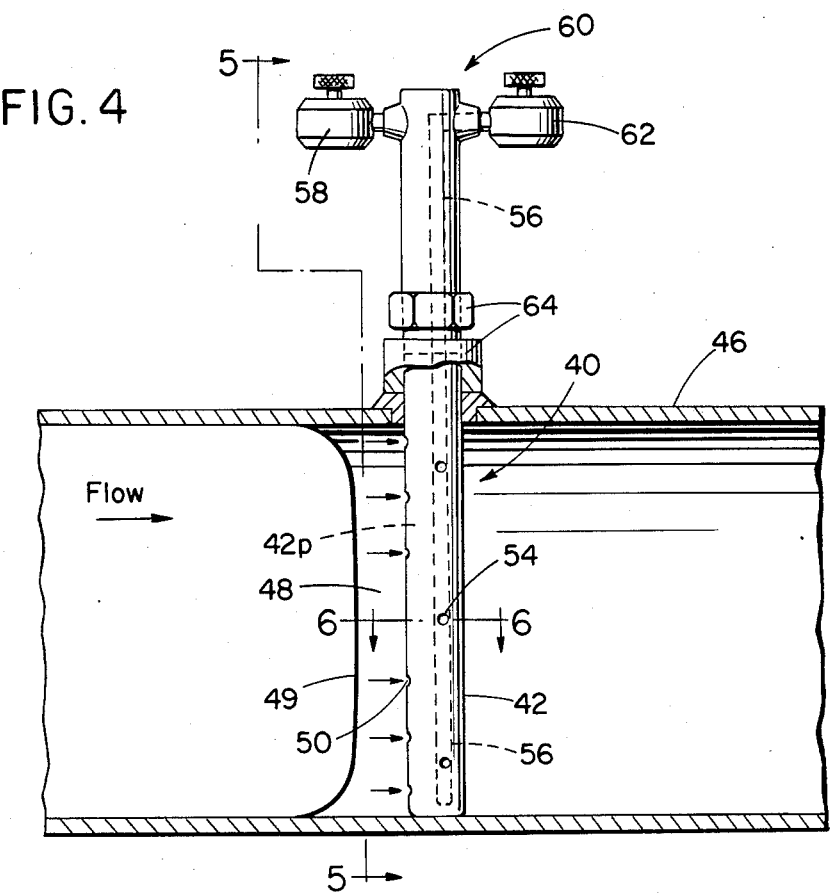
FIG. 4 is a cross-sectional view of a flow measuring device provided with a probe in accordance with the invention.

More specifically, as in the probe designs shown in FIGS. 1 and 2, in the probe 40 in accordance with the invention, the flowing fluid in a pipe or conduit 46 creates an impact or high (dynamic) pressure zone 48, having a turbulent, variable velocity distribution as illustrated by the curve 49 in FIG. 4, at the upstream side of the probe. An upstream portion 42u of the probe body 42 also is provided with a series of sensing ports 50 (only one shown in FIG. 3) opening into the interior of the probe body. However, in contrast to the probe designs shown in FIGS. 1 and 2, in the probe 40 in accordance with the invention, fluid flow around the probe body 42 is essentially laminar and the sub-boundary layers 44 of the fluid flow tend to separate smoothly from the probe body in separation regions (designated SR in FIG. 3) adjacent a downstream portion 42d of the probe, creating a low pressure zone 52 at the downstream side of the probe with a turn down ratio of approximately 10 to 1, which eliminates the creation of any downstream vortices or vacuum effects. Further, in contrast to the probe designs shown in FIGS. 1 and 2, in the probe 40 in accordance with the invention, the sensing of a low (static) pressure component is accomplished as is clearly shown in FIGS. 3 and 6, in a laminar flow area downstream from a minor axis of the probe body 42 and upstream from the separation regions SR at points of transition PT between an intermediate portion 42i of the probe body 42 and the downstream body portion 42d, by low pressure sensing ports 54 located at opposite sides of the probe body.

Figure 5:
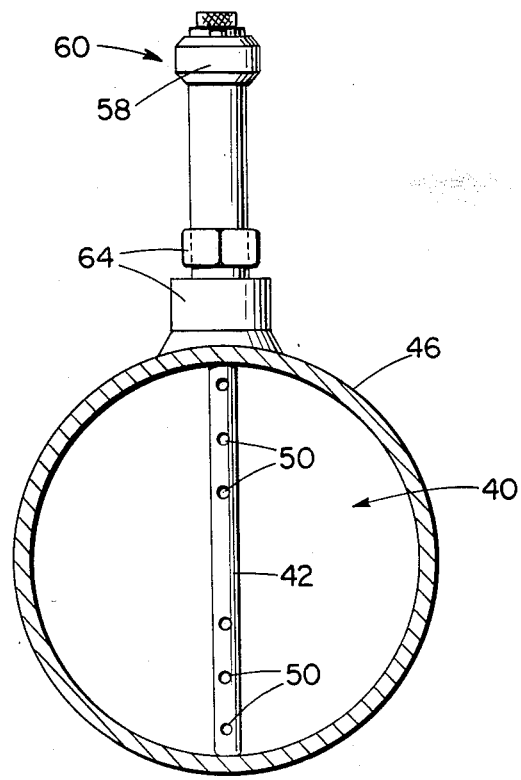
FIG. 5 is a cross-sectional view taken along the line 5—5 in FIG. 4.

In this regard, with reference to FIGS. 4 and 5, the elliptically-shaped probe 40 in accordance with the invention is, in operation, disposed linearly and diametrically across the pipe or conduit 46 as shown in these FIG. s, with the high (dynamic) pressure sensing ports 50 in the upstream edge of the probe body 42 facing upstream. The low (static) pressure sensing ports 54 are formed, in part, in opposite sides of an elongated low pressure sensing tube 56 disposed within the probe-body 42, with the sensing ports opening outwardly through opposite side walls of the body. The interior of the probe body 42 defines a passageway 42p and, at an upper end as viewed in FIGS. 4 and 5, is in fluid communication with a high (dynamic) pressure component sensing device 58 of a known type of pressure differential measuring mechanism 60, the details of which are not shown. Similarly, the low pressure sensing tube 56 extends upwardly (as viewed in FIGS. 4 and 5) within the probe body 42 and is in fluid communication with a low (static) pressure sensing device 62 of the pressure differential measuring mechanism 60. The probe 40 also is adjustably mounted on a wall of the pipe or conduit 46 by a suitable mounting mechanism 64 of a screw-threaded clamping type in a suitable manner.

Figure 6:
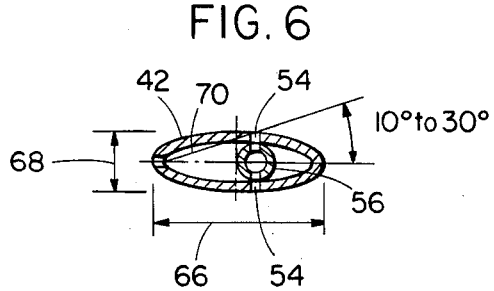
FIG. 6 is a cross-sectional view taken along the line 6—6 in FIG. 4 and illustrating additional features of the invention.

FIG. 6 illustrates additional features of the subject invention by which smooth laminar flow of the fluid in the conduit 46 and around the probe 40 is achieved, to obtain beneficial results. A transverse cross section of the probe body 42 has a major axis length 66 and a minor axis width 68, with the major axis length-to-minor axis width ratio being in a range on the other of 1.75 to 5.65. Further, a chord 70 of each quadrant of the cross section of the elliptically-shaped probe body 42, as illustrated by the upper left quadrant in FIG. 6, intersects the major axis of the body cross section at an angle in a range on the order of 10° to 30°. More specifically, for a chord intersection angle of 10°, the ratio is in a range on the order of 5.55 to 5.65, and for a quadrant intersection angle of 30°, the ratio is in a range on the order of 1.70 to 1.80.

Figure 7:
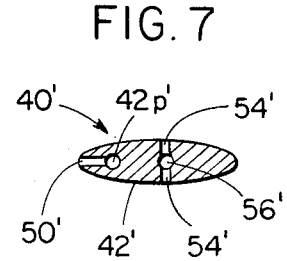
FIG. 7 is a cross-sectional view, similar to FIG. 6, of another embodiment of the invention.

FIG. 7 illustrates an alternate embodiment of the invention in which a probe 40' has an elliptically-shaped probe body 42' which is in the form of a solid rod. The solid rod body 42' has high pressure sensing ports 50', an elongated high pressure sensing passageway 42p', low pressure sensing ports 54' and an elongated low pressure sensing passageway 56', formed in the solid rod in a suitable manner, such as by drilling. In other respects, the probe 40 functions in the same manner as the probe 40 shown in FIGS. 3–6.

In summary, a new and improved self-averaging pitot tube probe and method for use in a measuring device (e.g., 60) for measuring a pressure differential to determine fluid flow rate in a pipe or conduit (e.g., 46), has been disclosed. The probe 40, for example, includes an elongated elliptically-shaped body 42 which is transversely insertable into a stream of the fluid flowing within the pipe or conduit 46, and has a configuration which produces a laminar flow of the fluid sub-boundary layers 44 around the body so that the fluid flow sub-boundary layers remain attached to the body for a major portion of the flow around the body. Further, the sensing of the low pressure component of the measured pressure differential is accomplished by the low pressure sensing ports 54 upstream from the sub-boundary layer separation regions SR in the laminar flow area. In addition, the creation of downstream turbulence in the form of fluid vortices, and/or the creation of downstream vacuum conditions are avoided. As a net result, more stable, uniform and accurate fluid flow rate measurements are obtained.

What is claimed is:

1. A pitot tube probe for use in a device for measuring a pressure differential to determine fluid flow rate in a conduit, which comprises:

an elongated body insertable transversely with respect to a stream of fluid flowing within the conduit, said body including an upstream portion, a downstream portion having upstream ends spaced from a downstream edge of said body, and an intermediate portion between the upstream portion and the upstream ends of the downstream portion, and said body having an elliptically-shaped configuration which produces a laminar flow of fluid around said body so that the fluid remains attached to said body and does not separate from said body at least until the fluid reaches the upstream ends of the downstream body portion;

upstream port means in the upstream portion of said elliptically-shaped body for sensing a high fluid pressure component of the measured pressure differential;

an elongated high pressure sensing passageway in said elliptically-shaped body in fluid communication with said upstream high pressure sensing port means;

an elongated low pressure sensing passageway in said elliptically-shaped body adjacent a transition from the intermediate body portion to the upstream ends of the downstream body portion and;

downstream port means opening from said low pressure sensing passageway through said elliptically-shaped body upstream from separation points at which said laminar flowing fluid separates from said elliptically-shaped body, for sensing a low pressure component of the measured pressure differential, said downstream port means located downstream from a minor axis of said elliptically shaped body between said minor axis and said separation points at which said laminar flowing fluid separates from said elliptically-shaped body.

2. The probe of claim 1 wherein:
said downstream port means includes ports which open through respective opposite sides of said elliptically-shaped body.

3. The probe of claim 2, wherein:
a plurality of said ports open through each of the opposite sides of said elliptically-shaped body along its length.

4. The probe of claim 1, wherein a transverse cross section of said elliptically-shaped body has a major axis length-to-minor axis width ratio in a range on the order of 1.70 to 5.65, with a chord of each quadrant of said body cross section intersecting the cross section major axis at an angle in a range on the order of 10° to 30°.

5. The probe of claim 1 wherein:
said upstream high pressure sensing port means includes ports which face upstream and are arranged along an upstream longitudinal edge of said elliptically-shaped body.

6. The probe of claim 1 wherein:
said elliptically-shaped body is of hollow construction; and
said low pressure sending passageway is defined by an elongated tube disposed in said hollow elliptically-shaped body.

7. The probe of claim 1 wherein:
said elliptically-shaped body is a solid bar having high and low pressure sensing port means and passageways formed therein.

8. The probe of claim 1, wherein the probe elliptically-shaped body extends linearly and is adapted to be disposed essentially diametrically across the conduit.

9. A pitot tube probe for use in a device for measuring a pressure differential to determine fluid flow rate in a conduit, which comprises:
an elongated, linearly extending body insertable transversely with respect to a stream of fluid flowing within the conduit, and essentially diametrically across the conduit, said body including an upstream portion, a downstream portion having upstream ends spaced from a downstream longitudinal edge of said body, and an intermediate portion between the upstream portion and the upstream ends of the downstream portion, and said body having an elliptically-shaped configuration which produces laminar flow of fluid around said body so that the fluid remains attached to said body and does not separate from said body at least until the fluid reaches the upstream ends of the downstream body portion;
a plurality of upstream-facing high pressure sensing ports arranged along an upstream longitudinal edge of said elliptically-shaped body;
an elongated high pressure sensing passageway in said elliptically-shaped body in fluid communication with said upstream high pressure sensing ports and extending essentially parallel to a longitudinal axis of said body;
an elongated low pressure sensing passageway in said elliptically-shaped body adjacent a transition from the intermediate body portion to the upstream ends of the downstream body portion and extending essentially parallel to the longitudinal axis of said body; and
a plurality of downstream low pressure sensing ports opening from said low pressure sensing passageway through each of respective opposite sides of said elliptically-shaped body along its length, said elliptically-shaped body having a major axis adapted to be aligned in the direction of fluid flow, and said low pressure sensing ports being located downstream from a minor axis of said elliptically-shaped body and upstream from separation points at which said laminar flowing fluid separates from said body; and
said elliptically-shaped body having a transverse cross section having a major axis length-to-minor axis width ratio in a range on the order of 1.70 to 5.65, with a chord of each quadrant of said body cross section intersecting the cross section major axis in a range on the order of 10° to 30°.

10. A method of measuring fluid flow rate in a conduit, which comprises the steps of:
inserting an elongated, elliptically-shaped body of a pitot tube probe into the fluid transversely with respect to the fluid flow, to create a high pressure component and a low pressure component;
arranging the elliptically-shaped body to produce a laminar flow of fluid around the elliptically-shaped body and so that the fluid remains attached to the body for a major portion of the fluid flow around the body;
sensing the high pressure component at an upstream end of the body;
sensing the low pressure component in a laminar flow region of the fluid flow downstream from a minor axis of the elliptically-shaped body and between the minor axis and the separation points at which the laminar flowing fluid separates from the body; and
transmitting the sensed high and low pressure components to a measuring device for measuring fluid flow rate.

11. The method as recited in claim 10, wherein the elliptically-shaped body is disposed linearly and essentially diametrically across the conduit.

* * * * *